(12) United States Patent　　(10) Patent No.:　　US 9,117,094 B2
Anckaert et al.　　(45) Date of Patent:　　Aug. 25, 2015

(54) DATA LOCATION OBFUSCATION

(75) Inventors: Bertrand Raphaël Anckaert, Moorsele (BE); Mariusz H. Jakubowski, Bellevue, WA (US); Ramarathnam Venkatesan, Redmond, WA (US); Chit Wei Saw, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1510 days.

(21) Appl. No.: 12/260,592

(22) Filed: Oct. 29, 2008

(65) Prior Publication Data

US 2010/0106920 A1　Apr. 29, 2010

(51) Int. Cl.
*G06F 12/14*　(2006.01)
*G06F 21/79*　(2013.01)

(52) U.S. Cl.
CPC ............ *G06F 21/79* (2013.01); *G06F 12/1408* (2013.01)

(58) Field of Classification Search
CPC ..... G06F 12/1408; G06F 21/79; G06F 21/72; G06F 21/14; G06F 21/123; G06F 21/125
USPC .......................................... 713/190; 711/154
See application file for complete search history.

(56) References Cited

U.S. PATENT DOCUMENTS

| 6,779,114 | B1 | 8/2004 | Chow |
| 7,254,586 | B2 | 8/2007 | Chen |
| 7,269,671 | B2 | 9/2007 | Pande |
| 2005/0002532 | A1 | 1/2005 | Zhou |
| 2005/0216611 | A1 | 9/2005 | Martinez |
| 2007/0234070 | A1 | 10/2007 | Horning |
| 2007/0234297 | A1* | 10/2007 | Zorn et al. ................. 717/124 |
| 2007/0239705 | A1 | 10/2007 | Hunt |
| 2009/0323932 | A1* | 12/2009 | Youn ................................ 380/30 |

OTHER PUBLICATIONS

Bhatkar, et al., "Address Obfuscation: An Efficient Approach to Combat a Broad Range of Memory Error Exploits", In Proceedings of the 12.sup.th USENIX Security Symposium, pp. 105-120, USENIX, Aug. 2003.*
Cowan et al., Pointguard: Protecting pointers from buffer overflow vulnerabilities. In Proceedings of the 12th USENIX Security Symposium, Washington, D.C., Aug. 2003, pp. 1-14.*
Goldreich et al, "Software protection and simulation on obivious RAMS" published in 1987 pp. 182-194.*
Sakurai et al., "A Code Transformation Method for Strong Migration Mobile Agent" published in 2007, pp. 485-488.*
Sandeep Bhatkar, et al., Address Obfuscation:An Efficient Approach to Combat a Broad Range of Memory Error Exploits http://seclab.cs.sunysb.edu/seclab/pubs/papers/ao.pdf Last acessed on Sep. 1, 2008, 16 pages.

(Continued)

*Primary Examiner* — Baotran N To
(74) *Attorney, Agent, or Firm* — Micah P. Goldsmith; Judy Yee; Micky Minhas

(57) ABSTRACT

Programs running on an open architecture, such as a personal computer, are vulnerable to inspection and modification. This is a concern as the program may include or provide access to valuable information. As a defense, the actual location of data can be hidden throughout execution of the program by way of periodic location reordering and pointer scrambling, among other things. These techniques serve to complicate static data flow analysis and dynamic data tracking thereby at least deterring program tampering.

19 Claims, 14 Drawing Sheets

(56) References Cited

OTHER PUBLICATIONS

Prashant Shah, Code Obfuscation for prevention of Malicious Reverse Engineering Attacks. http://islab.oregonstate.edu/koc/ece478/02Report/S2.pdf. Last acessed on Sep. 1, 2008, 12 pages.

Levent Ertaul, et al., Obfuscation Algorithms for Software Security http://www.mcs.csuhayward.edu/~lertaul/SER3012.pdf. Last accessed on Sep. 1, 2008, 7 pages.

* cited by examiner

DATA LOCATION OBFUSCATION

BACKGROUND

Software running on an untrusted host is inherently vulnerable to inspection and modification. Recent advances on the theoretical level have shown both negative and positive results on the possibility of protecting software within this severe threat model. However, little is known about the type of application one usually wants to protect.

Intuitively, any protection scheme other than a physical one depends on the operation of a finite state machine. Ultimately, given physical access, any finite state machine can be examined and modified at will given enough time and effort. However, increasing deployment of software can be observed on open architectures in scenarios where the software contains secret information or where integrity of the software is required by a business model. For example, access to copyrighted music and video is increasingly controlled by software-based digital containers. Further, the experience of multi-player games relies heavily on users not being able to gain competitive advantages through cheating. Software licenses also may be enforced through technical protection mechanisms embedded in the software, and as a final example ad-supported software relies on the ads being correctly displayed and reported.

The above examples illustrate current demand for practical defense mechanisms. Even if theoretically secure protection is impossible, the question is more whether the time and effort required to attack software can be increased to make the costs outweigh the benefits. Consider a simple "Hello World" program for example. Assume one desires to protect this against modification of the "Hello World" message. Without countermeasures, an attacker could easily replace the characters "World" with "Alice," for instance, in the binary using tools such as string and hex editors. However, even a limited amount of obfuscation would foil this straightforward attack and make it more economically viable for Alice to write her own "Hello Alice" program from scratch rather than modifying the existing "Hello World" program. From an economical point of view, the binary would then be sufficiently protected against this type of attack.

Practical obfuscation techniques are thus about raising the bar to a level that supersedes the incentive of the attacker. This incentive is composed of many factors such as perceived consequences, facilitating conditions, and habits.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to data location obfuscation. Various practical techniques are provided for hiding data flow patterns to complicate attacks based on data flow analysis and/or memory traces. According to a disclosed aspect, protection can be afforded by periodically reordering or shuffling data in memory while preserving original program functionality. Salted encryption can also be utilized in combination with periodic reordering to protect data further. Additionally, pointer references can be scrambled to blur or obfuscate relations between different pointers.

In accordance with an aspect of the disclosure, techniques for data flow pattern hiding can be embodied within a secure memory management component. Programs can then be transformed into data location obfuscated programs by redirecting memory requests and accesses, among other things, to the secure memory management unit, which mediates program access to memory.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to data location obfuscation are described in detail hereinafter. Program memory operations are directed through a secure memory management component (SMMC). As the SMMC mediates access to memory, such as a heap, it can periodically reorder data in memory thereby making it harder for an attacker to track data flow during program execution. To further add complexity and deter tampering, data can be encrypted and periodically re-encrypted differently. Additionally, pointers returned to the program can be scrambled to further prevent analysis and revelation of information based on location.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
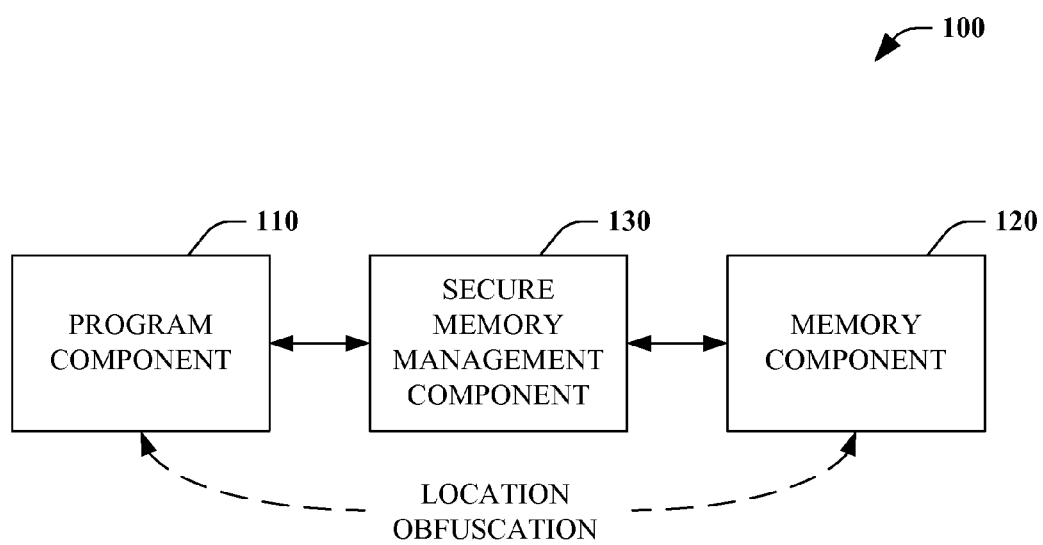
FIG. 1 is a block diagram of a data location obfuscation system in accordance with an aspect of the disclosure.

Referring initially to FIG. 1, a data location obfuscation system 100 is illustrated in accordance with an aspect of the claimed subject matter. The system 100 includes a program component 110, memory component 120, and secure memory management component (SMMC) 130. The program component 110 refers to a computer program comprising instructions or code that embodies functionality performed upon execution, thereby transforming a general computer into a specialized machine. The program component 110 employs main storage or memory 120 to facilitate expeditious execution. For example, the memory component 120 can include a code segment, stack segment and heap segment to aid execution by capturing code, temporary data for local functions, and information that remains in existence for the duration of program execution, respectively.

The SMMC 130 acts as an intermediate between the program component 110 and memory component 120. Moreover, the SMMC 130 can reorder data periodically with respect to memory component 120 while maintaining original functionality of program component 110, thereby obfuscating data location and complicating attacks based on data flow analysis and/or memory traces. In other words, the SMMC 130 can mediate accesses of memory component 120 by program component 110 and make the reordering as transparent as possible to the program component 110.

A dataflow graph of a program or a way to describe access patterns of a program can be sought by a hacker or other malicious entity to access sensitive information or aid tampering, among other things. The system 100 adds security to memory management via SMMC 130. By periodically reordering data in memory in an automated manner, the data flow graph can essentially be flattened. This means that a hacker is unable or at least not easily able to discern patterns in the data flow.

As the term component indicates, the secure memory management component 130 can be embodied as hardware software or a combination thereof. Despite the promise of widespread distribution of trusted platform modules (TPM), many scenarios may not be able to rely on trusted hardware for years to come. These scenarios may require correct operation of software on legacy systems or on systems whose owners are reluctant to enable such modules because of fears of privacy breaches and user lock-in. Accordingly, employing software results in a practical compromise among cost, security, and viability. Furthermore, this allows for parameterization of extent and frequency of reordering. However, implementation is by no means limited to software. In fact, a more optimized solution could be available with a dedicated SMMC 130 implemented in hardware or a combination of software and hardware memory management.

Figure 2:
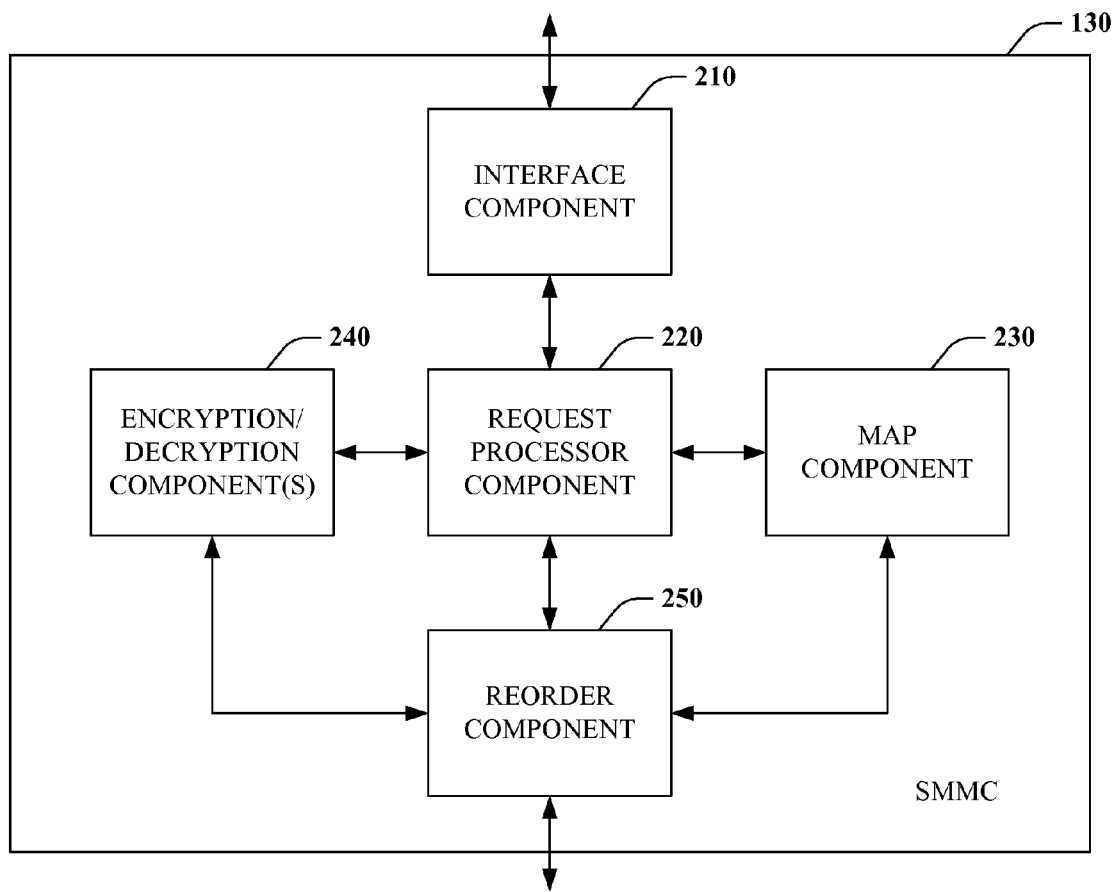
FIG. 2 is a block diagram of a representative secure memory management component according to a disclosed aspect.

FIG. 2 illustrates a representative SMMC 130 in accordance with an aspect of the claimed subject matter. The SMMC 130 includes an interface component 210 that facilitates interaction between a program and the SMMC 130. In accordance with one aspect, the interface component 210 can correspond to an application-programming interface (API) wherein the program calls particular SMMC functions, methods or the like. As an alternative, the interface component 210 can capture particular memory access operations and map them to SMMC 130 operations. Regardless, interface component 210 communicates program operations to request processor component 220.

The request processor component 220 processes or mediates memory interactions from program. The interactions can include memory requests (e.g., malloc, calloc, realloc, free . . . ) and data accesses (e.g., read, write . . . ), among other things. In accordance with one aspect of the claimed subject matter, the data need not be in the location expected or referenced by the program. Consequently, the request processor component 220 can utilize map component 230 to identify specific data locations where necessary. The map component 230 provides a map or transformation of program specified locations and actual memory locations. Further, the request processor component 220 can employ the encryption/decryption component(s) 240 to encrypt or decrypt data. For example, specific data or units of storage, such as pages, can be encrypted and as such require decryption to return data. Similarly, data or units of storage may require encryption upon writing data to memory.

Reorder component 250 reorders data in memory or a portion thereof automatically. The degree and extent of reorder can be controlled via parameters, among other things. In one instance, reordering can be performed after the occurrence of a predetermined number of memory requests/accesses. Of course, reordering can also be performed periodically or after various periods of time regardless of the occurrence of a memory event. Upon permuting location, changes can be noted by the reorder component 250 in the map component 230. Furthermore, the reorder component 250 may need to utilize the encryption/decryption component 240 to decrypt and re-encrypt data or units thereof. In fact, re-encryption can occur with a different salt and/or encryption method in accordance with an aspect of the claims to provide further data protection. Reordering can even be a trigger for re-encryption of portions affected or unaffected by the reordering.

Figure 3:
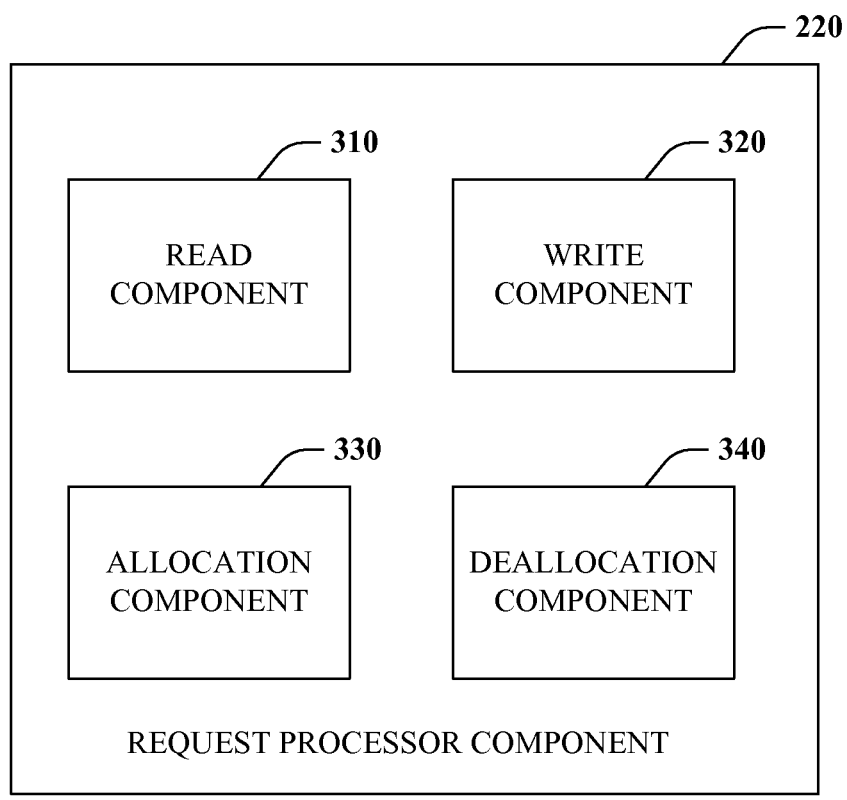
FIG. 3 is a block diagram of a representative request processor component according to an aspect of the disclosure.

Turning attention to FIG. 3, a representative request processor component 220 is illustrated in accordance with an aspect of the claimed subject matter. The request processor component 220 includes components for data access, read component 310 and write component 320, and memory requests, allocation component 330 and deallocation component 340.

When data is read from or written to memory or a portion thereof, the SMMC can be utilized. The read component 310 and write component 320 can correspond to getter and setter functionality associated with a variety of types (as well as arbitrary sized aggregates). Furthermore, the read component 310 can include functionality to retrieve more data than requested to obscure the identity of the data requested. Similarly, the write component can write more than identified by a program at substantially the same time and/or retrieve more data than necessary to obfuscate a write operation. For instance, a plurality of memory storage units can be acquired even though only one unit is necessary for a write operation. Furthermore, the write operation can even rewrite data in particular units to further add confusion to a data flow.

The allocation component 330 and deallocation component 340 are a substitute of such conventional program commands such as "malloc," "calloc," "realloc," and "free," among others. Each component can be implemented in various ways and in different contexts. By way of example and not limitation, consider a situation where the SMMC 130 operates with a paging system. For requests larger than a page size, the smallest number of pages capable of serving a request are reserved. For requests smaller than the size of a page, a buddy memory allocation mechanism can be used: start from a block the size of a page and split it in two until the size of the smallest power of two larger than the request is obtained. Free blocks of different sizes (e.g., one list for every power of two up to the page size) can also be kept track of to serve a memory request when previously allocated memory is no longer used.

Pointers returned to a program do not need to correspond directly to the actual location of memory. However, if it is desired that pointer arithmetic be performed independently, care should be taken so that the memory area accessible to the returned pointer does not fall within the memory range accessible through previously returned pointers. To understand why this is important, consider the following example.

Suppose a program can request a memory block of size "s," and a pointer "p" can be returned. Next, the program requests an additional block of memory. A pointer within the range [p, p+s] cannot be returned as subsequent data accesses into this area could have been computed from the first pointer and there would be no way to discriminate them. This can be achieved by having a simple relation between the regular allocation mechanism done behind the scenes and the pointers returned to the program. This relation is not one to one, as a quick and easy way to derive the offset and page address in the program's data space is desired. To this end, the pages in the program's address space can be page size aligned.

Furthermore, for performance requirements, it may be best to make sure that the pointers in the program's data space are isomorphic with respect to addition, subtraction, and comparison, amongst others. This way the program can still perform pointer arithmetic directly on the pointers. However, maintaining this isomorphism can reveal additional information. For example, if two integers are allocated on the same page, this will be detectable. To alleviate this issue, pointers can be optionally scrambled and returned to the program.

Figure 4:
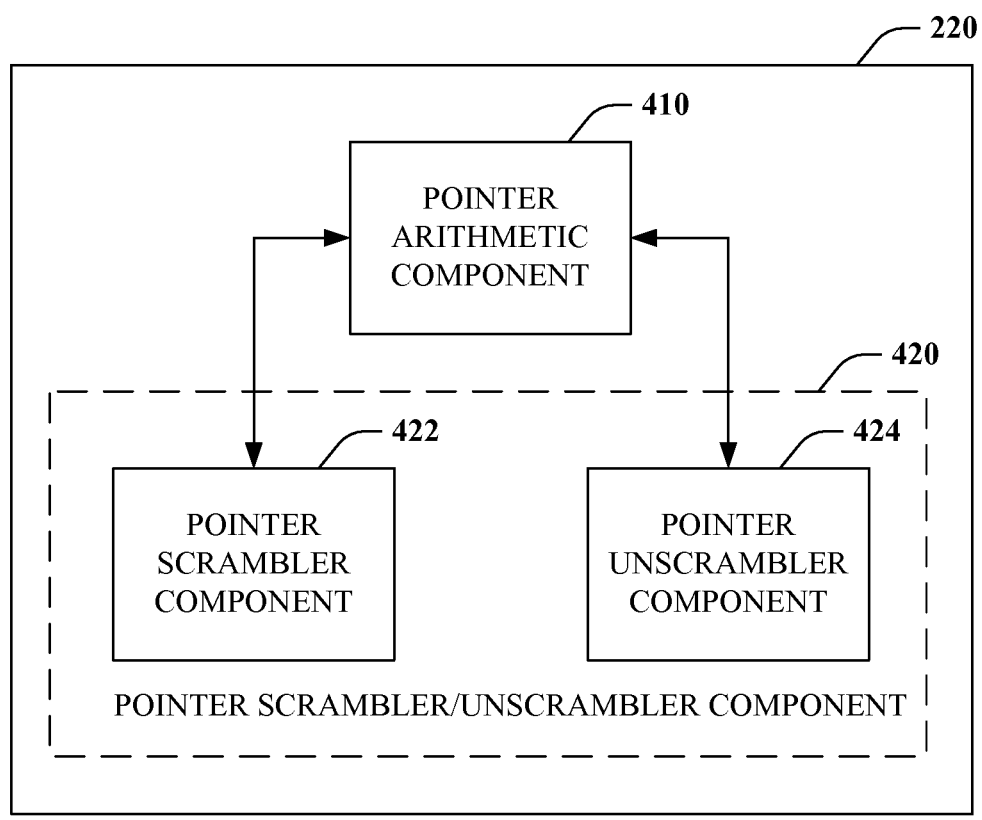
FIG. 4 is a block diagram of a representative request processor component that processes pointers in accordance with an aspect of the disclosure.

FIG. 4 is illustrates a representative request process component 220 that processes pointers. In accordance with an aspect of the claimed subject matter, pointers can be scrambled to avoid revealing location information, and blur relations between different pointers returned to a program, among other things. In this instance, pointer arithmetic can be directed through the SMMC 130 and more specifically request process component 220 rather than performed independently since scrambled pointers can lack the isomorphic property to support arithmetic operations. Accordingly, the request process component 220 can include a pointer arithmetic component 410 that can perform operations such as addition, subtraction, and comparison with the help of pointer scrambler/unscramble component 420 and its sub components scrambler component 422 and unscramble component 424. Where the pointer arithmetic component 410 receives multiple pointers on which to perform operations, the unscramble component 424 can be utilized to normalize or remove the scrambling associated with each pointer prior to operation execution. Subsequently, operands and/or results can be scrambled via scramble component 422 prior to return to a program.

Figure 5:
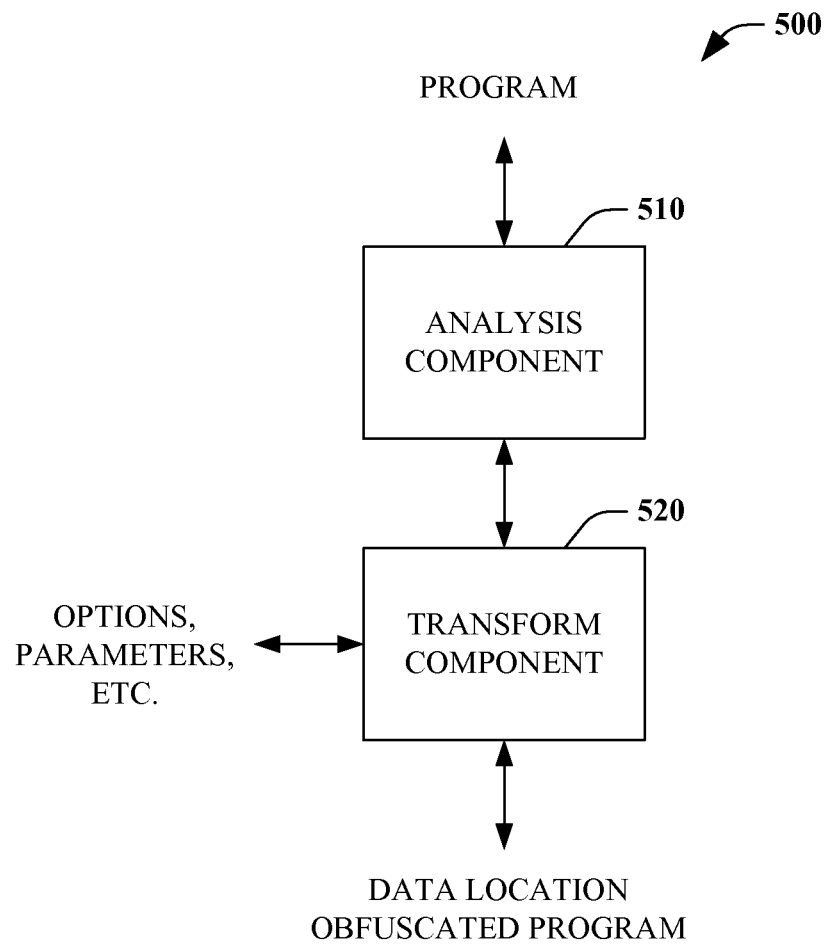
FIG. 5 is a block diagram of a program transformation system according to an aspect of the disclosure.

Referring to FIG. 5, a program transformation system 500 is depicted in accordance with an aspect of the claimed subject matter. The system 500 includes an analysis component 510 that analyzes an input program. In particular, the analysis component can identify portions that access memory, for example reads, writes, allocations, and/or deallocations, among others. Transform component 520 can transform or otherwise map such accesses or operations to a secure memory management component 130 (FIG. 1). For instance, a read operation can be transformed to a SMMC getter instruction and a write operation can be mapped to a setter instruction. Additionally, the portions of the program can be modified to facilitate use of the SMMC 130 as will be described further infra.

Still further yet, the transformations can be governed by options, parameters, profiles or the like provided thereto, or retrieved or generated thereby. By way of example and not limitation, pointer scrambling can be turned on or off. Where pointer scrambling is turned on, the transform component 520 alone or in conjunction with the analysis component 510 can map pointers and pointer arithmetic through the SMMC 130. In another example, parameters can be specified concerning the extent and or degree of reordering to be performed which can be respected by the transformation system 500. In yet another instance, profile information or the like can be provided to the transformation system or generated by the analysis component 510 pertaining to how to limit application techniques to specific portions of a program to optimize performance.

In accordance with one aspect, the system 500 can be employed statically prior to execution to transform a program into a data location obfuscated program. For example, the transformation system 500 can form part of a compiler or compilation process that compiles programs into binaries or the like. However, the system 500 can also support dynamic transformation or a combination of static and dynamic transformation. In such a case, memory requests and/or accesses, for example, can be captured and redirected in at runtime. Similarly, transformation can depend on runtime context information such as processor load and potential for security threat, among other things.

Referring back to system 100 of FIG. 1 briefly, it is to be appreciated that the obfuscation can occur with respect to a program and any unit or granularity of data. In fact, code can even be treated as data and subject to reordering and mapping to needed code segments, inter alia. The SMMC 130 could then make requested code available for execution by one or more processors.

One unit of data that is often used by applications or programs is a heap. Accordingly, what follows is a more detailed description of the system 100 in the context of a heap and page based memory management. Furthermore, various aspects of the claims will be described in further detail with respect to this particular embodiment. Of course, this is not intended to limit the scope of the claims in any way, but rather to facilitate clarity and understanding of claimed aspects.

Figure 6:
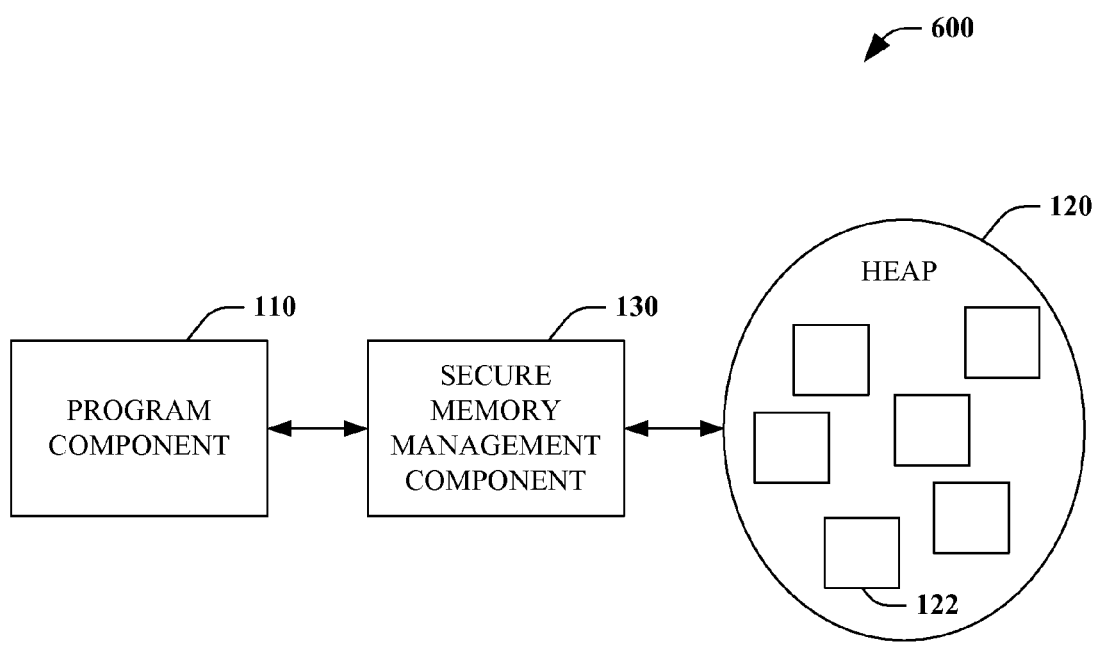
FIG. 6 is a block diagram of a data location obfuscation system utilized in the context of a heap in accordance with a disclosed aspect.

FIG. 6 is a data location obfuscation system 600 utilized in the context of a heap in accordance with an aspect of the claims. Similar to system 100 of FIG. 1, the system 600 includes the program component 110 and secure memory management component 130. Here, however, the memory 120 corresponds to a specific type of memory namely heap memory or simply a heap, which is a pool or segment of main memory designated for program use that exists for the duration of program execution. For instance, a heap is often utilized to hold information about reference types such as classes, interfaces, delegates, objects, strings, etc. Furthermore, the heap 120 can comprise a plurality of units of storage 122 such as pages. The heap 120 differs from other types of memory including but not limited to stack memory as will be discussed further infra.

The SMMC 130 mediates all accesses to the heap 120, making reordering as transparent as possible to the program component 110. As accessing the heap is a common operation, overhead should not be too large. Therefore, a mechanism derived from paging can be employed to keep track of the current location of data.

The heap 120 can be divided into pages 122 of a certain size "s" (e.g., s=4 KiB) and the location of each allocated page can be tracked through a mapping. For every access to the heap 120, "n+1" pages can be randomly permuted with probability "1/p," where "n" and "p" are security parameters that can be tweaked to enable a trade-off between performance and security. Additionally, pages can be encrypted. To make it harder to detect the permutation through binary similarities, for instance, salting can be employed. This means that before every encryption the pages are padded with a different value, which will result in different encrypted pages, even for identical content (because of the unique salt).

As a consequence of such a reordering mechanism, correspondence between pointers in a program's data space and the actual location of data in memory varies over time. The correct mapping can be considered known solely by the SMMC 130. As with traditional paging mechanisms, tables to map pointers to actual locations of pages can be stored in pages as well. With 4 KiB pages, for example, two levels of indirection would suffice to retrieve the requested page.

Software-based protection in the malicious-host model suffers from the absence of a nucleus of trust. In order to make claims about security of the applied technique, it is assumed that the SMMC 130 can be trusted. This is an engineering assumption. However, if the trusted component can be made small enough, the problem of protecting a generic program is reduced to the problem of protecting a very specific smaller piece of code. The SMMC 130 can then in practice be protected by existing techniques from the domain of obfuscation and individualization, for instance. The security claims that follow assume that the SMMC 130 can perform encryption and decryption, has access to a pseudo-random number generator, and has memory required to swap two pages.

Each time a data item on a given page is read or written by a program, "n" additional pages are pulled into the SMMC 130 with probability "1/p." The requested operations are performed; the pages are salted differently, re-encrypted, and put back into memory in a random permutation. This is the root of confusion for an attacker.

With every step, different candidate locations exist for the location of a particular piece of data. If it is assumed that the accesses to the heap 120 are random, then the following construction may be used to get the average number of possible candidates assuming that "p=1."

Assume that there are "N" pages in total. The problem can be tackled as follows: When a page is accessed, it will be pulled into the SMMC 130, along with "n" additional pages. After the first time step "t," "n" pages are written back to memory in a random permutation over the "n+1" pages, while one page is retained in the SMMC 130. After the first time step, there are "n+1" candidate locations for the page that was actually requested. This can be denoted "$C(t_1)$=n+1," or the confusion at time step "$t_1$" is "n+1."

These pages can be marked as "red." In the next step, "n" random pages are taken from "N−1" pages not yet in the SMMC 130. Every taken page that was not yet marked "red" now becomes "red."

To access the additional number of pages marked at each time step, a sequence of draws from a finite population without replacement is defined by a hypergeometric distribution. As such, the average number of marked pages in a sequence of "n" draws from the "N−1" candidates of which "$C(t_i)$−1" are marked at time step "$t_{i+1}$" is given by "$n(C(t_i)-1)/(N-1)$." As a result, the following equation for confusion can be obtained:

$$C(t_i) = 1 + n$$

$$C(t_{i+1}) = C(t_i) + n - n(C(t_i)-1)/(N-1)$$

One can easily verify that this converges to "N," since no more candidates are added once "$C(t_i)$" equals "N." Thus, for "n=N−1" and "p=1," true oblivious RAMs can be obtained under the specified assumptions.

The SMMC 130 can mediate every access to the heap 120. It can take care of the allocation and release of dynamic memory as well. Therefore, all calls to memory management functions (e.g. malloc, calloc, realloc, free . . . ) are redirected. One dynamic memory allocation mechanism can use buddy blocks for allocations smaller or equal to page size "s." When no previously allocated memory is available for reuse, memory can be allocated per page. If the block is more than twice as large as desired, it can be broken in two. One of the halves can be selected, and the process repeats until the block is the smallest power of two larger than or equal to the request.

A list of free blocks of different sizes can be maintained. When blocks are freed, the buddy of that block can be checked; if it is free as well, they can be merged once again. In the presence of free blocks, a request for memory can be started from the smallest free block that can serve the request. For blocks larger than the page size "s," the smallest number of pages sufficient to serve the request can be allocated.

Pointers returned to a program do not need to correspond directly to the actual location of data. However, if it is desirous to allow the program to perform pointer arithmetic independently, care should be taken that the returned pointers can be the result of a regular allocation mechanism. This means that memory requests should not return pointers that fall within previously allocated memory areas in the programs data space. Otherwise, during a subsequent memory access, one would be unable to determine whether the pointer was computed through an offset from an earlier location or originated with the request.

This can be resolved by maintaining a straightforward relation between pointers returned by regular memory requests performed by the SMMC 130 behind the scenes and pointers returned by the program component 110. This relation need not be one-to-one to facilitate future memory accesses.

As pointers seen by the program component 110 do not correspond to the location of data in memory, read and write operations to the heap should be intercepted. These memory accesses may be anywhere in the memory area allocated by the program component 110, and there should be an easy way to translate the addresses to the correct location of data at the time the request is made. Therefore, it is desired that the pointers returned to the program from a memory request are page sized aligned. On subsequent accesses, the offset on the page can be easily determined, and a mapping will translate the page address as seen by the program to the actual current location on the page.

When speaking in terms of the heap 120, this implies the techniques discussed only affects data on the heap. In many scenarios, local variables of a program can contain critical information or their integrity can be crucial for uncompromised execution of a program. Hence, local variables from a stack or stack memory can optionally be migrated from the stack to the heap by transformation system 500 of FIG. 5.

In practice, definitions of local variables can be replaced by pointer creations through memory requests, for example during a program transformation process. In other words, required memory is allocated when a variable is declared. Subsequent uses of the local variable can then be adapted to go through the pointer to the memory location. If the variable goes out of scope, the memory can be freed.

As previously mentioned, it may be desirable to blur the relation between different pointers returned to a program by scrambling the pointers. If left unscrambled, the relation between different pointers can reveal, for example, that different smaller memory areas have been allocated on the same page, or that two independently computed pointers are related.

Transforming page addresses to page-size aligned addresses to facilitate subsequent data accesses has an isomorphic property, as previously described. However, this restriction makes it hard to hide the relation between different pointers as well. On the other hand, if the pointers are scrambled more thoroughly, the program can no longer operate on pointers directly. As a result, if extensive pointer scrambling is turned on, pointer arithmetic can be redirected to the SMMC 130 as well.

As with any form of obfuscation, interfacing with external code poses a challenge. The problem is that the external code may not be under program or developer control and therefore cannot be modified to take data obfuscation into account. Consequently, data needs to be put into its original format before it is passed to external code. This poses a potential security risk, as it forces the code to contain functionality to undo transformations. Thus, reliance on external code should be reduced to a minimum. For example, library functions should be internalized and included in the transformation as much as possible. Ideally, the only time data is normalized is just prior to input/output, as this cannot be avoided when preserving relevant behavior of a program.

Here, as the pointers in the program's data space no longer point to the actual data, a problem arises when pointers are passed to code that is beyond control. This problem occurs when pointers escape to library functions or system calls.

Other than internalizing external code, there are at least two strategies that can be employed by the transformation system 500 of FIG. 5, for example, to deal with this situation. The first is to normalize the data. This would mean that all memory accessible through the escaping pointers be reordered so that the memory is in the correct layout and to pass the correct pointer to this memory area. This may require extensive normalization of memory via recursive processes, since external code may receive aggregate arguments that in turn contain pointers to various memory locations from which other memory locations may become accessible. The second approach is to redirect calls to those library functions to internal code that will emulate the library functions in such a way that they take the shuffled layout into account.

The first approach is more general and requires less domain specific knowledge. However, it increases the attack surface of the SMMC 130, as it should now contain functionality to turn the memory blocks back into a normal layout. This should probably be avoided. In yet another alternative, data that may escape to library functions or system calls can be excluded from transformation in accordance with the subject disclosure. This makes sense since as this data may be revealed anyway when crossing the boundary. On the other hand, it is not easy to determine conservatively and accurately the data that could potentially escape during execution of a program.

A related problem is pointers coming in from external code such as library functions. These may pose a problem because it may be hard to distinguish them from scrambled pointers. Again, there are at least two possible solutions that can be implemented by the transformation system 500. The first is to take an all or nothing approach. In this solution, as soon as new pointers are created (e.g. by library calls, dereferences . . . ), they can be absorbed into the scheme by notifying the SMMC 130 of the creation and using a modified pointer subsequently. This way it is ensured that the pointers have been masked (if masking is turned on), and that they go through the translation mechanism for each memory operation.

Once again, this may create problems if pointers to pointers or structs containing pointers are passed to the program. However, most pointers created by external functions are the result of memory allocation, which is intercepted anyway. One notable exception is command-line arguments, which are passed as an array of strings (e.g., char pointers). As the number of arguments is known and the structure of the array is well known, these pointers can be absorbed as well.

The second approach is to mark the pointers under the control of the SMMC 130. This can be done by relying on the fact that a target operating system a portion of virtual address space can be reserved for the kernel. This means that the program should not see pointers for which the highest bit is set. Marking thus includes setting this highest bit, which will identify pointers that are part of the data location obfuscation scheme. Furthermore, this marking does not break pointer arithmetic, which means that such arithmetic can still be done directly by the program if extensive pointer scrambling is not activated.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation balance between security and performance can be inferred as a function of contextual information by the secure memory management component 130 and utilized to govern its actions.

In view of the exemplary systems described supra, methodologies that may be implemented in accordance with the disclosed subject matter will be better appreciated with reference to the flow charts of FIGS. 7-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
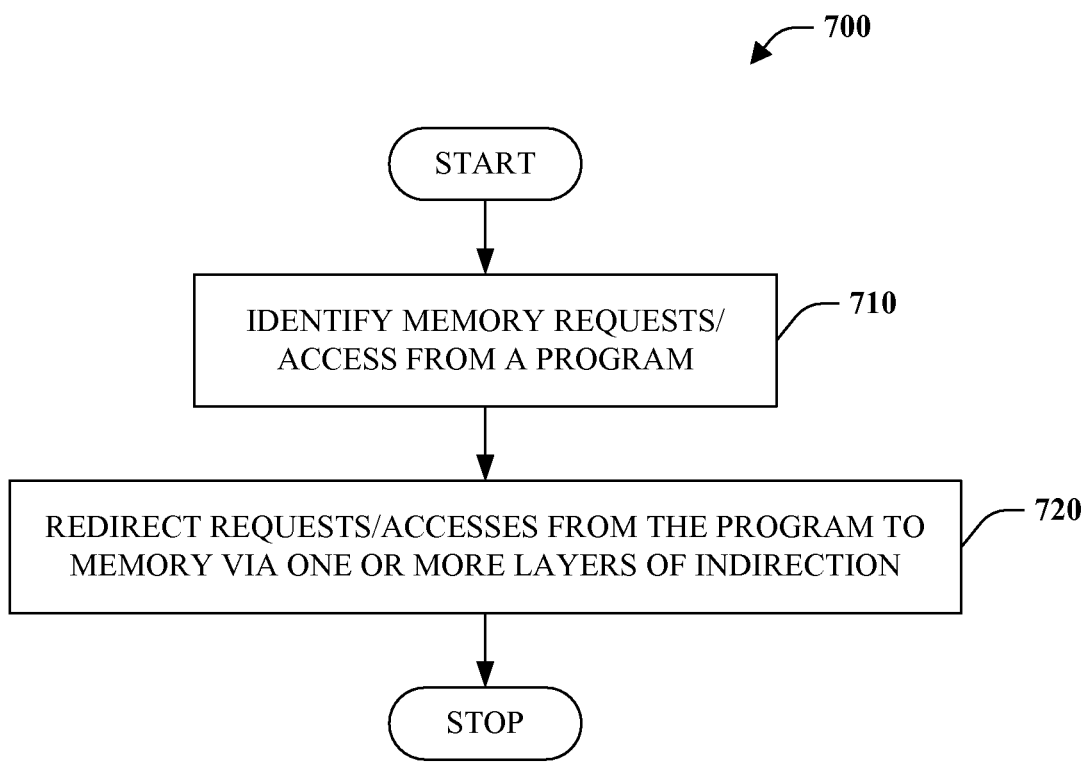
FIG. 7 is a flow chart diagram of a method of securing programs in accordance with an aspect of the disclosure.

Referring to FIG. 7, a method 700 of securing a program is illustrated in accordance with an aspect of the claimed subject matter. At reference numeral 710, memory requests and/or accesses from a program are identified including but not limited to read, write, allocate, and/or deallocate operations. At numeral 720, the identified memory requests and/or accesses are redirected from the program to memory via one or more layers of indirection. In accordance with one embodiment, data locations can be changed periodically unbeknownst to the program. Accordingly, program specified data locations or addresses can be mapped or translated to actual addresses utilizing a secure memory management unit for example. In this manner, the data flow or access pattern can appear to an outside observer to be random.

Figure 8:
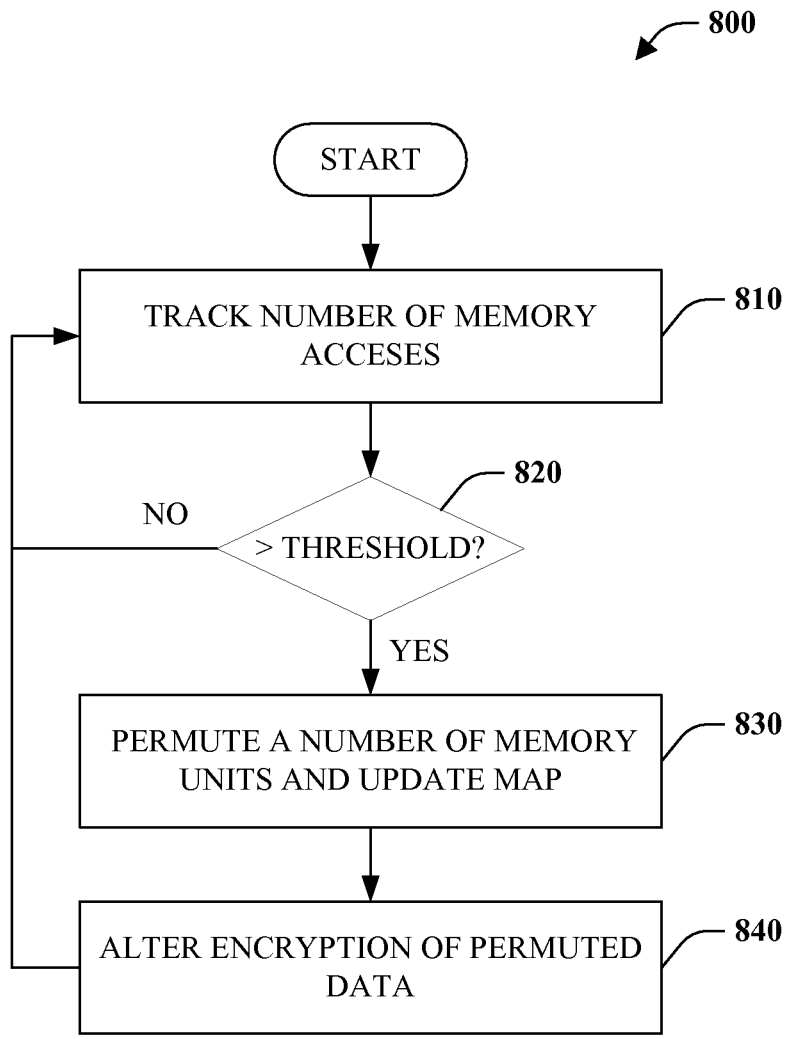
FIG. 8 is a flow chart diagram of a method of secure processing in accordance with a disclosed aspect.

FIG. 8 depicts a method of secure program processing according to an aspect of the claimed subject matter. At reference numeral 810, the number of memory accesses, requests, or the like are tracked. For example, each memory read operation can correspond to memory an access as would each write. At numeral 820, a determination is made as to whether the number of accesses exceeds or is greater than a threshold value. If the threshold has not been exceeded ("NO"), the method loops back to numeral 810 to continue tracking accesses. If the threshold is exceeded at numeral 820 ("YES"), the method proceeds to reference 830 where a number of memory units are permuted and a map is updated to reflect changes made. In this manner, the threshold value represents a parameter for controlling how often permutation is performed. At reference numeral 840, permuted data can also be subject to altered encryption as well prior to returning to reference numeral 810. For example, an encryption algorithm can employ a different salt to change the encryption applied to groups of data/units of memory (e.g., page) and/or the particular data itself.

Figure 9:
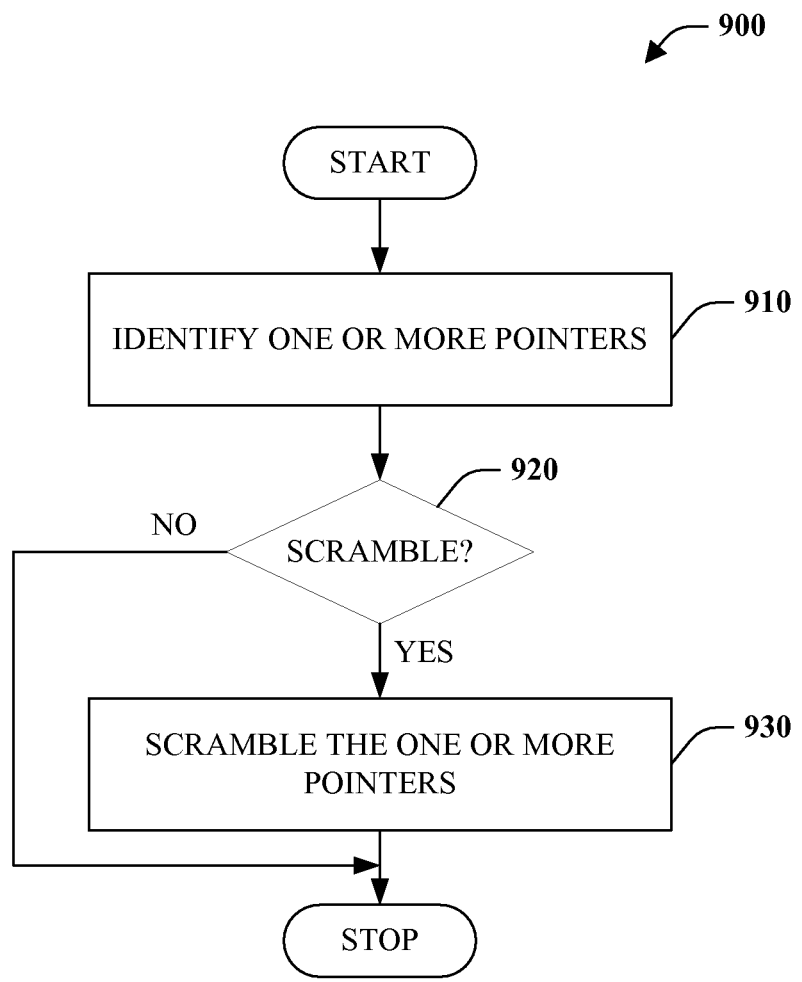
FIG. 9 is a flow chart diagram of a method of obfuscating data locations in accordance with an aspect of the disclosure.

FIG. 9 is a flow chart diagram of a method of obfuscating data location 900 in accordance with an aspect of the claimed subject matter. At reference numeral 910, one or more pointers are identified. At reference 920, a determination is made as to whether or not the pointers should be scrambled. For performance requirements, it may be best to make sure that the pointers in a program's data space are isomorphic with respect to addition, subtraction, comparison, or the like. This way a program can perform pointer arithmetic directly on the pointers. However, maintaining such isomorphism can reveal additional information. For example, if two integers are allocated on the same page, this will be detectable. To address this issue, pointers returned to a program can optionally be scrambled. The determination at 920 can involve checking a supplied option or parameter specifying whether scrambling is on or off, according to one embodiment. If scrambling is determined to be undesirable at numeral 920 ("NO"), the method simply terminates. Alternatively, if scrambling is desired ("YES"), the method continues at numeral 930 where the pointers are scrambled. Various methods, techniques, algorithms or the like can be utilized to perform such scrambling. As a simple non-limiting example, pointers can be scrambled with an exclusive-or (xor) provided with a constant.

Figure 10:
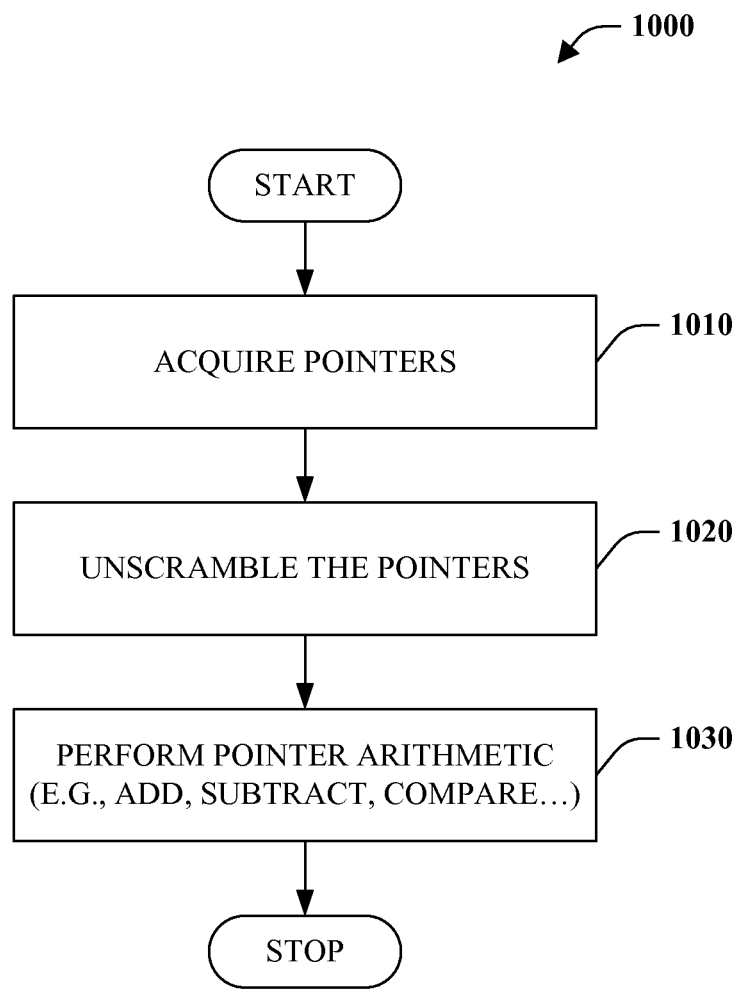
FIG. 10 is a flow chart diagram of a method of processing pointers according to a disclosed aspect.

FIG. 10 is a flow chart diagram of a method 1000 of processing pointers in accordance with an aspect of the claimed subject matter. As previously mentioned with respect at least to FIG. 9, pointers can be scrambled to prevent revealing location information. However, this prevents a program from independently performing pointer arithmetic. Accordingly, method 1000 represents functionality performed by a separate component such as a secured memory management component. At reference numeral 1010, one or more pointers are received, retrieved, or otherwise acquired. At numeral 1020, the pointers are unscrambled and finally at reference 1030, the pointer arithmetic is performed. For example, constants can be added or subtracted from pointers, one pointer can be subtracted from another, and/or pointers can be compared.

Figure 11:
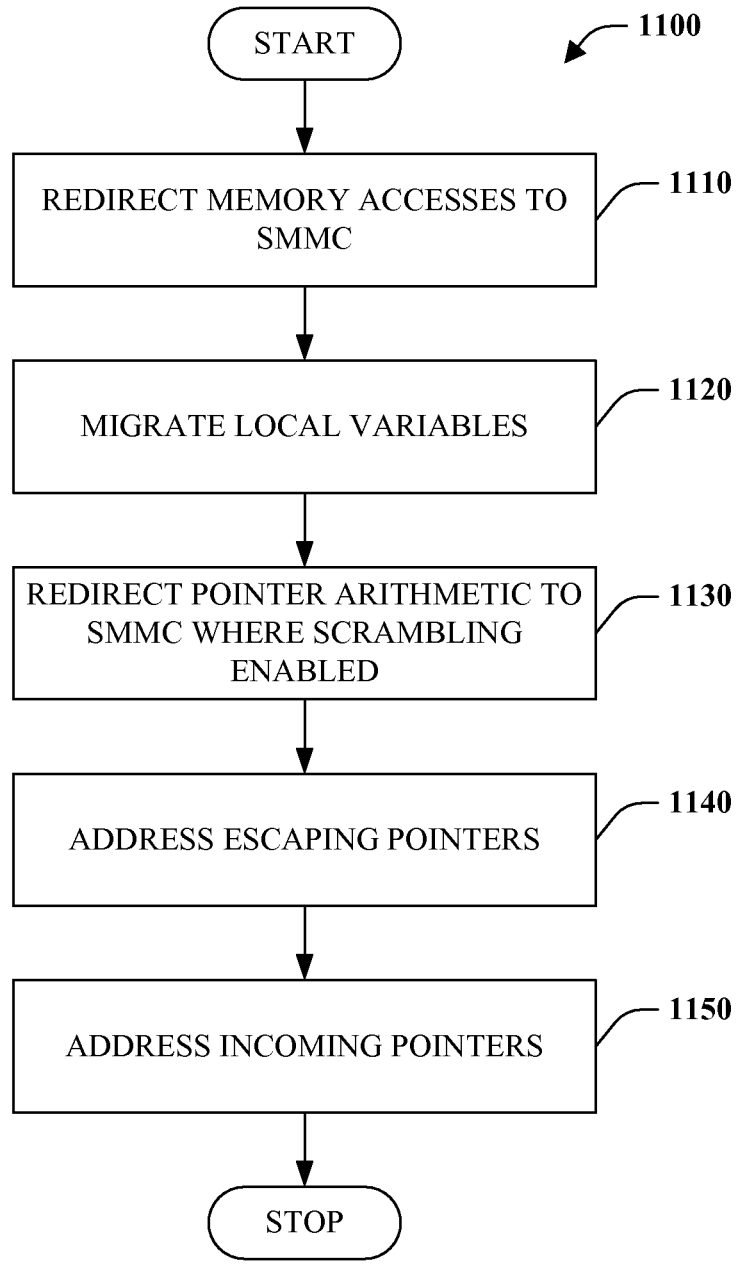
FIG. 11 is a flow chart diagram of a method of program transformation in accordance with an aspect of the disclosure.

FIG. 11 illustrates a method of program transformation 1100 in accordance with an aspect of the claimed subject matter. At reference numeral 1110, all memory accesses, requests and the like are redirected to a secure memory management component to enable location obfuscation. At numeral 1120, local variables are migrated. For example, where memory corresponds to a program heap, local variables can be migrated to the heap to enable such data to be processed by the secure memory management component. At numeral 1130, pointer arithmetic operations are redirected through the SMMC where scrambling is enabled.

At reference 1140, escaping pointers are addressed. This can be accomplished in a variety of different ways. For instance, functionality can be inserted for undoing transformations or normalizing data. Alternatively, code that emulates external functionality can be injected and escaping calls redirected to the injected code such that the shuffled layout is taken into account. Yet another way to address escaping pointers is to opt not to include data that may escape in the obfuscation scheme.

At reference numeral 1150, incoming pointers can be addressed. Similar to escaping pointers, incoming pointers pose a relate problem with multiple potential solutions. In particular, it can be hard to distinguish incoming pointers from scrambled pointers. One way to address this issue is to inject functionality to absorb incoming pointers into the scheme by scrambling the incoming pointers upon receipt. Alternatively, functionality can be provided to denote that scrambled pointers under control of the SMMC.

Figure 12:
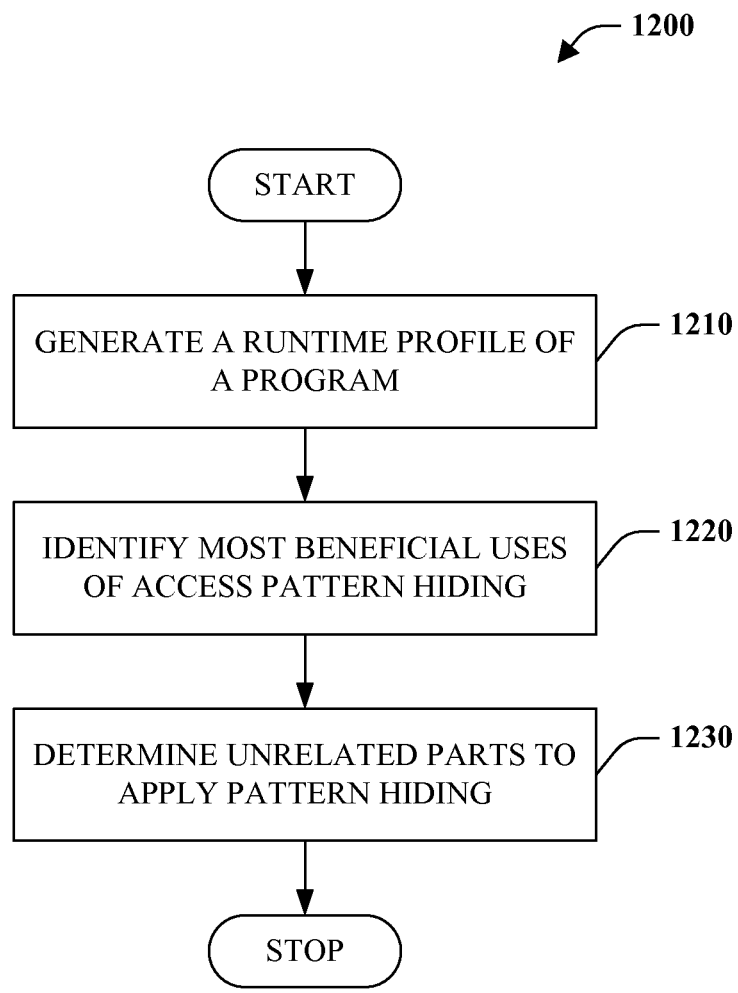
FIG. 12 is a flow chart diagram of a method of performance optimization according to a disclosed aspect.

Turning attention to FIG. 12, a flow chart diagram is provided of a method of performance optimization 1200 in accordance with an aspect of the claimed subject matter. At reference numeral 1210, a runtime profile is generated for a program. At numeral, 1220, the most beneficial uses of data access pattern hiding are identified from the profile. In this manner, data access pattern hiding techniques can be applied selectively to improve performance. For example, applications such as digital rights management (DRM) and access control involve Boolean checks executed outside performance-sensitive program paths. Such security tests may be required just once, a few times, or infrequently during runtime. These operations often can be made orders of magnitude slower without perceptively affecting user experience. Accordingly, these portions of an application can be determined to benefit the most. Furthermore, when better optimized, data access hiding techniques can be use in more performance-oriented applications such as stream decryption with sensitive keys, amongst others. At reference numeral 1230, unrelated portions of the application are determined for application of hiding techniques. To avoid attracting attention to security-critical code that is subject to data access hiding technology, various other unrelated parts of an application can be protected as well.

The aforementioned systems, methods, techniques and the like can be employed for both obfuscation and tamper resistance. Most existing techniques from the domain of tamper-resistance focus on protecting the integrity of code and are based on check summing segments of the code. Related techniques hash the execution of a piece of code while others have looked at the reaction mechanism in more detail. Once tampering is detected, appropriate action is taken. If the manifestation of this action is too obvious, it can be easily tracked down. Delayed and controlled failures are a way to make it harder to locate the reaction mechanism.

Software obfuscation aims to make programs harder to understand. There is a considerable body of work on code obfuscation that focuses on making it harder for an attacker to decompile a program and extract high-level semantic information. The above-described techniques are complementary to existing work and focus on making it harder to detect dynamic data flow.

White-box cryptography can be seen as a specific clearly defined problem in obfuscation. Here, the goal is to hide a secret key in a cryptographic software implementation in the malicious host model. Aspects of the claimed subject matter can help to defend against certain attacks based on analyzing dataflow, but should be viewed as one component of a comprehensive software-protection toolbox.

One particular example described above to facilitate clarity and understanding concerned utilizing a heap in conjunction with a paging mechanism. It is to be appreciated that various other embodiments are also possible and contemplated. For instance, data can be kept in a self-balancing binary search tree. This way data can be retrieved by looking for it in a binary tree. As the tree is self-balancing, the data reordering would be automatic. A splay-tree implementation is also possible to further exploit data locality, as recently accessed items will be near the top of the tree.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
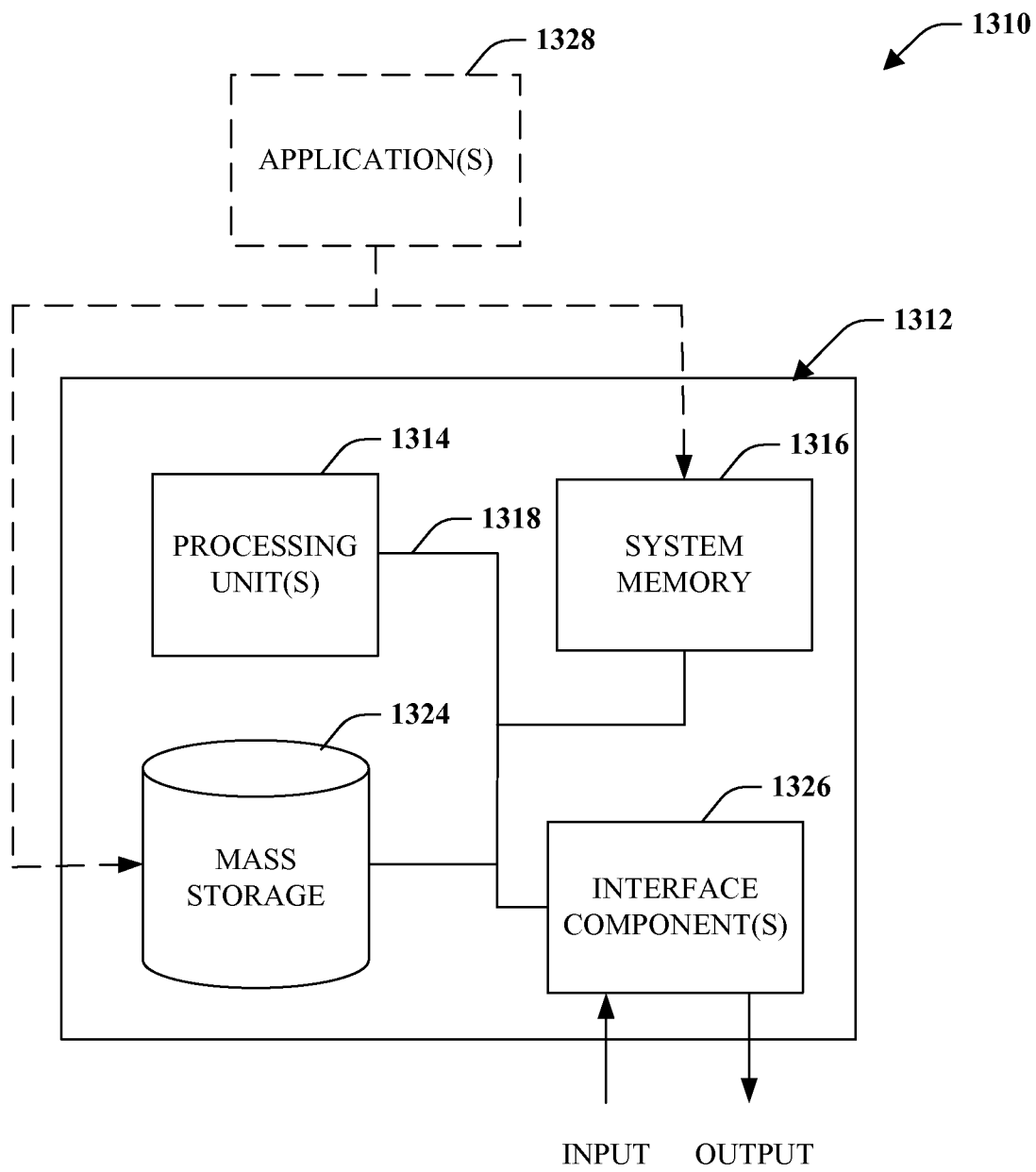
FIG. 13 is a schematic block diagram illustrating a suitable operating environment for aspects of the subject disclosure.
Figure 14:
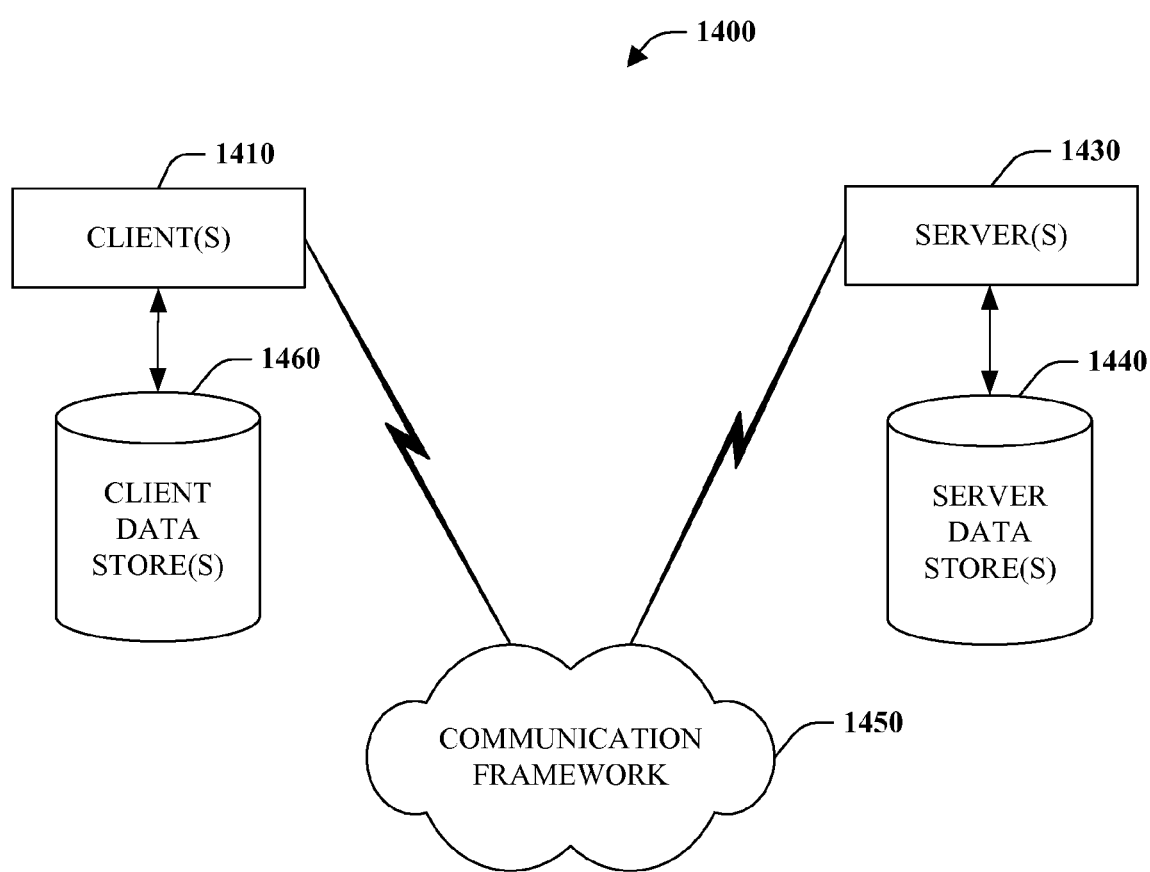
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/nonvolatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1312 to output device(s) via interface component 1326. Output devices can include displays (e.g. CRT, LCD, plasma . . . ), speakers, printers, and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. By way of example and not limitation, a program can be sent from a client 1410 to a server 1430 for execution by the server 1430 in a private way such that the server 1430 does not learn much about the program, but rather just computer results and returns them to a client requester. Data access pattern hiding techniques can be employed in this type of client/server environment to where computation is outsourced. Such techniques can enable hiding access patterns from not just the server 1430 but also any eavesdroppers on the communication framework 1450. Once specific exemplary application can include next generation web applications where much computation is down on a client 1410 and the server stores data and does some of the computation. In this case, it might be desirous to what data is being accessed and when it is being accessed. Furthermore, it is to be noted that at least portions of the techniques described above can be embodied as a web or network service. By way of non-limiting example, program transformation can be embodied as a web service.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A data location obfuscation system, comprising:
a processor;
a memory accessible to the processor;
a computer program component stored on the memory and executable via the processor; and
a memory management component stored on the memory and executable via the processor that reorders, during execution of the computer program component, data locations of the computer program component to defend against discernment of data flow patterns, wherein the memory management component is configured to determine that scrambling is turned on and, based at least in part on the determination, scramble pointers returned by the memory management component to the program to blur relations between pointers.

2. The system of claim 1, further comprising a heap memory, wherein the computer program component is stored on the heap memory.

3. The system of claim 2, further comprising a transformation component stored on the memory and executable via the processor that migrates stack-based local variables of the computer program component to the heap memory to enable protection thereof.

4. The system of claim 1, wherein the memory management component comprises a pointer unscrambler component stored on the memory and executable via the processor that unscrambles pointers to facilitate arithmetic operations amongst pointers.

5. The system of claim 1, wherein the memory management component performs a memory access operation by retrieving a first amount of data from memory, wherein the first amount of retrieved data is more than a second amount of data required to satisfy the memory access operation.

6. The system of claim 1, wherein the memory management component comprises an encryption/decryption component that encrypts or re-encrypts data with different salts.

7. The system of claim 1, wherein the memory management component performs unrequested memory access operations to obscure an identification of data of the computer program component.

8. The system of claim 1, wherein the memory management component is configured to provide levels of obfuscation based at least in part on at least one of user input or program profile information.

9. The system of claim 1, wherein the memory management component performs a memory access operation for a first page of data by:
- retrieving the first page of data and a number of additional pages of data from the memory;
- encrypting each page of data with a different salt; and
- storing, in a random permutation, each encrypted page of data in the memory.

10. A method of data location obfuscation, comprising:
- mediating access to a heap memory of a computing device by a program executing on the computing device;
- reordering data of the program on the heap memory during execution of the program on the computing device while retaining original program functionality; and
- randomly permuting a subset of the heap memory upon each access, wherein the heap memory is divided into pages and at least one of the pages is encrypted with a salt, and wherein the randomly permuting includes:
  - permuting "n" pages with probability "p", where "n" and "p" include modifiable security parameters; and
  - re-encrypting the at least one of the pages with a different salt based at least in part on individual accesses of the subset of the heap memory.

11. The method of claim 10, further comprising applying and removing encryption to heap data using salting.

12. The method of claim 10, further comprising scrambling pointers returned to the program.

13. The method of claim 10, wherein each of the pages is encrypted with the salt and the randomly permuting further includes:
- retrieving the pages from the subset of the heap memory;
- re-encrypting each of the pages with a new salt to generate re-encrypted pages; and
- storing the re-encrypted pages in the subset of the heap memory.

14. A method of securing computer programs, comprising:
- identifying heap memory operations in a computer program, the heap memory operations including requests and accesses;
- redirecting the heap memory operations by the computer program to a secure memory management component;
- migrating local variables of the computer program from a stack memory to the heap memory;
- shuffling, by the secure memory management component and during execution of the computer program, locations of data of the computer program in a heap memory while maintaining original program functionality; and
- receiving a reorder-trigger, wherein the shuffling locations of data of the computer program in a heap memory is performed responsive to the reorder-trigger, and wherein shuffling locations of data comprises:
  - retrieving multiple units of encrypted data from the heap memory;
  - decrypting the retrieved multiple units of encrypted data to produce multiple units of non-encrypted data;
  - re-encrypting multiple units of non-encrypted data to produce multiple units of re-encrypted data, wherein at least two units of re-encrypted data were re-encrypted with different salts; and
  - storing the multiple units of re-encrypted data, in a random permutation, in the heap memory.

15. The method of claim 14, further comprising:
- replacing definitions of the local variables of the computer program with pointer creations through memory requests; and
- for each of the redefined local variables, adapting subsequent uses of the local variable to go through the corresponding pointer.

16. The method of claim 14, further comprising:
- redirecting pointer arithmetic to the secure memory management component; and
- scrambling, by the secure memory management component, one or more pointers subject to arithmetic operations.

17. The method of claim 14, further comprising:
- redirecting calls to external library functions to internal code; and
- emulating the external library functions with the internal code in such a way that takes a shuffled memory layout into account.

18. The method of claim 14, further comprising:
- identifying pointers coming from a library function; and
- either scrambling the pointers or distinguishing the incoming pointers from scrambled pointers to facilitate correct execution of pointer arithmetic.

19. The method of claim 14, further comprising:
- providing the reorder-trigger responsive to either one of:
  - determining that a period of time since a most immediate prior reordering having occurred is greater than a threshold time period; or
  - determining that a number of memory requests/accesses is greater than a threshold amount.

* * * * *